United States Patent
Harris et al.

(10) Patent No.: US 9,482,115 B2
(45) Date of Patent: Nov. 1, 2016

(54) TURBINE ENGINE SUPPORT ASSEMBLY INCLUDING SELF ANTI-ROTATING BUSHING

(75) Inventors: Meggan Harris, Colchester, CT (US); Jorge I. Farah, Hartford, CT (US); Christopher Treat, Manchester, CT (US); Timothy Dale, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1008 days.

(21) Appl. No.: 13/592,391

(22) Filed: Aug. 23, 2012

(65) Prior Publication Data

US 2014/0056704 A1 Feb. 27, 2014

(51) Int. Cl.
*F01D 25/28* (2006.01)
*F01D 25/16* (2006.01)
*F16B 9/02* (2006.01)

(52) U.S. Cl.
CPC ............. *F01D 25/28* (2013.01); *F01D 25/162* (2013.01); *F16B 9/023* (2013.01); *Y10T 29/49323* (2015.01)

(58) Field of Classification Search
CPC ....... F01D 25/28; F01D 25/162; F16B 9/023
See application file for complete search history.

(56) References Cited

U.S. PATENT DOCUMENTS

| | | | | |
|---|---|---|---|---|
| 1,873,450 A | * | 8/1932 | McFarlin | H01T 1/00 29/592.1 |
| 3,236,342 A | * | 2/1966 | Persson | E06B 3/12 403/408.1 |
| 3,985,172 A | * | 10/1976 | Ballantyne | F16B 37/068 29/512 |
| 4,589,155 A | * | 5/1986 | Jeal | 470/19 |
| 5,160,251 A | | 11/1992 | Ciokajlo | |
| 5,676,510 A | * | 10/1997 | Fischer | B60J 5/0431 411/104 |
| 5,699,944 A | * | 12/1997 | Duran | B60R 9/04 224/309 |
| 5,860,576 A | | 1/1999 | Duran | |
| 7,516,534 B2 | | 4/2009 | Easterbrook et al. | |
| 8,051,664 B2 | | 11/2011 | Fish | |
| 8,151,619 B2 | | 4/2012 | Pyper et al. | |
| 8,152,427 B2 | * | 4/2012 | Moore | 411/301 |
| 8,171,738 B2 | | 5/2012 | Fish et al. | |
| 8,469,413 B2 | * | 6/2013 | Novajovsky | E05B 15/0245 292/341.15 |
| 2003/0118419 A1 | | 6/2003 | Easterbrook et al. | |
| 2004/0048073 A1 | | 3/2004 | Bacon, Jr. | |
| 2004/0240987 A1 | | 12/2004 | Czachor et al. | |
| 2005/0037876 A1 | | 2/2005 | Unno et al. | |
| 2006/0093465 A1 | | 5/2006 | Moniz et al. | |

(Continued)

FOREIGN PATENT DOCUMENTS

| | | |
|---|---|---|
| EP | 1149987 | 10/2001 |
| EP | 2261439 | 12/2010 |

OTHER PUBLICATIONS

International Preliminary Report on Patentability for PCT Application No. PCT/US2013/055490, mailed Mar. 5, 2015.

(Continued)

*Primary Examiner* — John K Fristoe, Jr.
*Assistant Examiner* — Brian O Peters
(74) *Attorney, Agent, or Firm* — Carlson, Gaskey & Olds, P.C.

(57) ABSTRACT

A turbine engine includes multiple tierod supports. Each of the tierod supports is connected to an inner frame case of the turbine engine via multiple fasteners and at least one self anti-rotating bushing component.

10 Claims, 3 Drawing Sheets

(56) References Cited

U.S. PATENT DOCUMENTS

| | | |
|---|---|---|
| 2009/0283640 A1* | 11/2009 | Ebner .......................... 244/131 |
| 2010/0132370 A1 | 6/2010 | Durocher et al. |
| 2010/0290903 A1 | 11/2010 | Heyerman et al. |
| 2011/0029689 A1 | 2/2011 | Darbyshire et al. |
| 2012/0051903 A1 | 3/2012 | Heyerman et al. |
| 2013/0094951 A1* | 4/2013 | McCaffrey .................. 415/200 |

OTHER PUBLICATIONS

International Search Report for PCT Application No. PCT/US2013/055490 mailed Jun. 10, 2014.

Extended European Search Report for Application No. 13853570.3 dated Mar. 23, 2016.

* cited by examiner

TURBINE ENGINE SUPPORT ASSEMBLY INCLUDING SELF ANTI-ROTATING BUSHING

TECHNICAL FIELD

The present disclosure relates generally toward structural supports for turbofan engines, and more particularly toward a self anti-rotating bushing for the same.

BACKGROUND OF THE INVENTION

Modern turbine engines, such as turbine engines for commercial aircraft, include support frames that structurally support an inner frame case and an outer frame case of the turbine engine. In one configuration, multiple tierods are arranged radially around the inner frame case and connect the inner frame case to the outer frame case in a spoke configuration. In this configuration, the tierods are fastened to the inner and outer frame cases using bolts, or other fasteners, that pass through holes in both the frame case and the corresponding tierod base. A separate clinch nut and anti-rotation component is used with each fastener to maintain the fastener in place and to prevent the fastener from counter rotating and disengaging.

Some turbine engine designs, such as those with a small core structure, have insufficient clearance for a clinch nut and other anti-rotating components.

SUMMARY OF THE INVENTION

A self anti-rotating bushing component according to an exemplary embodiment of this disclosure, among other possible things includes a first threaded bushing portion having a first threaded fastener hole, a second threaded bushing portion having a second threaded fastener hole, and a material tie portion connecting the first threaded bushing portion and the second threaded bushing portion.

In a further embodiment of the foregoing self anti-rotating bushing component, each of the first threaded bushing portion, the second threaded bushing portion, and the material tie portion are constructed of a single block of material.

In a further embodiment of the foregoing self anti-rotating bushing component each of the first threaded bushing portion comprises a first extended threading bushing and the second threaded bushing portion comprises a second extended threading bushing such that each of the first and second bushing portions have a greater length along an axis defined by the first bushing portion than the material tie.

In a further embodiment of the foregoing self anti-rotating bushing component, the first extended threading bushing has a first radial wall width, the second extended threading bushing has a second radial wall width, and the first radial wall width is larger than the second radial wall width.

In a further embodiment of the foregoing self anti-rotating bushing component, the first extended threading bushing has a first radial wall width, the second extended threading bushing has a second radial wall width, and the first radial wall width and the second radial wall width are the same.

In a further embodiment of the foregoing self anti-rotating bushing component, threading in the first and second threaded holes is non-deforming threading.

In a further embodiment of the foregoing self anti-rotating bushing component, threading in the first and second threaded holes is self-locking threading.

In a further embodiment of the foregoing self anti-rotating bushing component, each of the first and second bushing portions include a lip portion partially circumferentially surrounding each of the threaded fastener holes, and each of the lip portions has a length along an axis defined by the fastener holes equal to a thickness the material tie along an axis of either of the first or second threaded holes.

A turbine engine according to an exemplary embodiment of this disclosure, among other possible things includes an inner frame case and an outer frame case, at least one support assembly connecting the inner frame case to the outer frame case, the support assembly comprises a plurality of tierod support members arranged circumferentially about the inner frame case, each of the tierod support members comprises an inner base portion, an outer base portion, and a stem portion, such that each tierod has a generally I-shaped cross section, and each of the inner base portions comprises a plurality of base portion fastener hole, and each of the tierod support members is connected to the inner frame case via a case connection assembly including a self anti-rotating bushing component having a first threaded bushing portion with a first threaded fastener hole, a second threaded bushing portion with a second threaded fastener hole, and a material tie portion connecting the first threaded bushing portion and the second threaded bushing portion.

In a further embodiment of the foregoing turbine engine, the first threaded bushing portion comprises a first extended threaded bushing and the second threaded bushing portion comprises a second extended threaded bushing such that each of the first and second bushing portions have a greater length along an axis defined by the first bushing portion than the material tie, and wherein the first extended threaded bushing portion extends into one of the plurality of base portion fastener holes and wherein the second extended threaded bushing portion extends into another of the plurality of base portion fastener holes, such that threading is extended into the base portion fastener holes.

In a further embodiment of the foregoing turbine engine, the first extended threaded bushing has a first radial wall width, the second extended threaded bushing has a second radial wall width, and the first radial wall width is larger than the second radial wall width.

In a further embodiment of the foregoing turbine engine, the first extended threaded bushing is press fit in a base portion fastener hole and the second extended threaded bushing is loose fit in a base portion fastener hole.

In a further embodiment of the foregoing turbine engine, the first extended threaded bushing extends into a base portion fastener hole having a first radius and the second extended threaded bushing extends into a second base portion hole having a second radius such that one of the first and second extended threaded bushings is press fit into a base portion fastener hole and the other of the first and second extended threaded bushings is loose fit into a base portion fastener hole.

In a further embodiment of the foregoing turbine engine, threading in the first and second threaded fastener holes is non-deforming threading.

In a further embodiment of the foregoing turbine engine, threading in the first and second threaded fastener holes is self-locking threading.

In a further embodiment of the foregoing turbine engine, the material tie portion of the self anti-rotating bushing component prevents rotation of the self anti-rotating bushing component during installation of a fastener.

A method of connecting a tierod support to a frame case according to an exemplary embodiment of this disclosure, among other possible things includes extending a first fastener through an inner frame case, through an tierod base portion, and into a first threaded bushing of a self anti-rotating bushing component, extending a second fastener through the inner frame case, through the tierod base portion, and into a second threaded bushing of a self anti-rotating bushing component, screwing the fasteners into the threaded bushings, and preventing the first threaded bushing and the second threaded bushing from rotating during any of the previous steps using a material tie connecting the first threaded bushing to the second threaded bushing.

In a further embodiment of the foregoing step of connecting a tierod support to a frame case press fitting one of the first threaded bushing or the second threaded bushing into a corresponding tierod base portion hole, and loose fitting the other of the first threaded bushing or the second threaded bushing into another corresponding tierod base portion hole.

DETAILED DESCRIPTION

Figure 1:
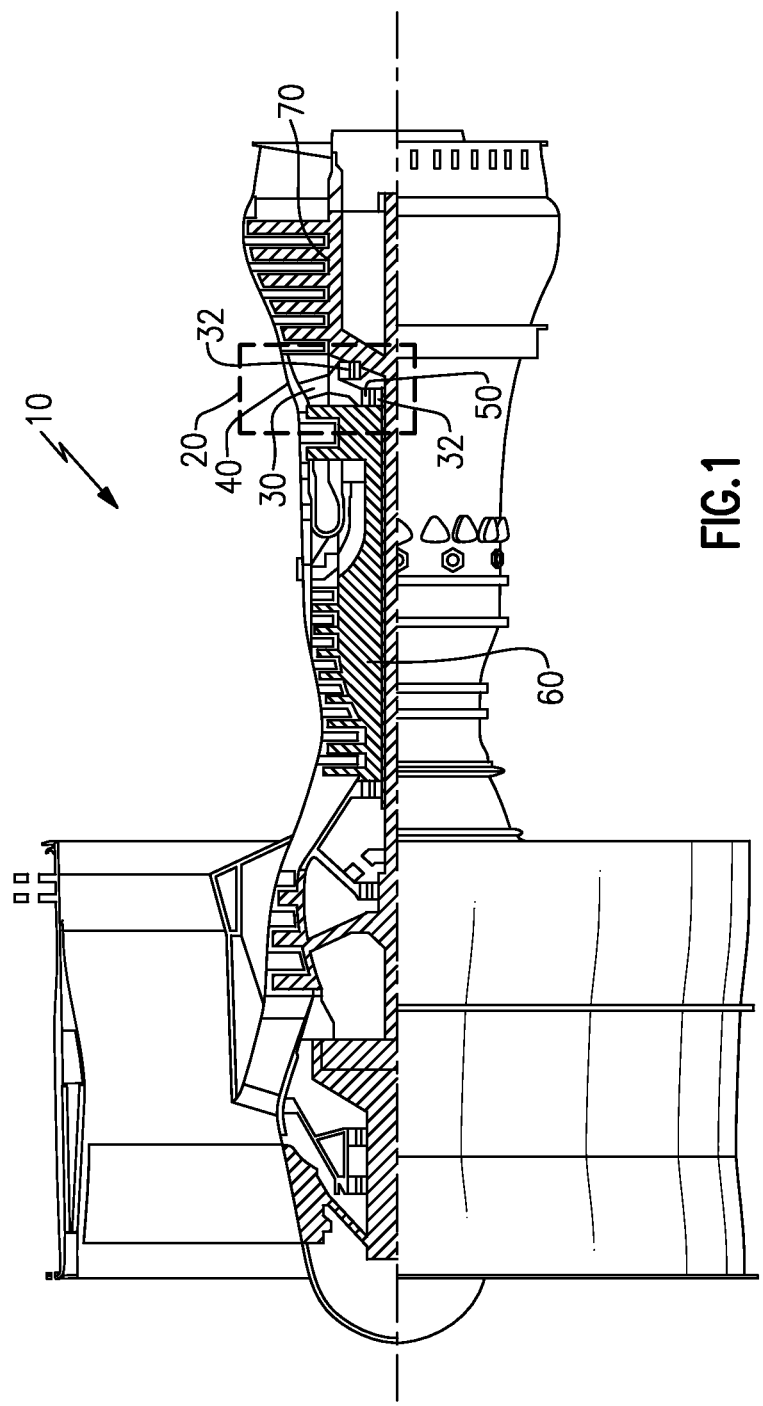
FIG. 1 schematically illustrates an example turbine engine.

FIG. 1 schematically illustrates a gas powered turbine engine 10. The turbine engine 10 has multiple turbine modules including a mid turbine frame 20, located between the high pressure and low pressure turbine modules. The mid-turbine frame 20 contains an outer case structure 40 and inner case structure 50 which house a vane structure. Additional supports 30 connect the outer case structure 40 and inner case structure 50, and are arranged circumferentially in a spoke configuration. The support assemblies 30 are load bearing members and ensure that the inner case structure 50 remains centered to the outer case structure 40.

Figure 2:
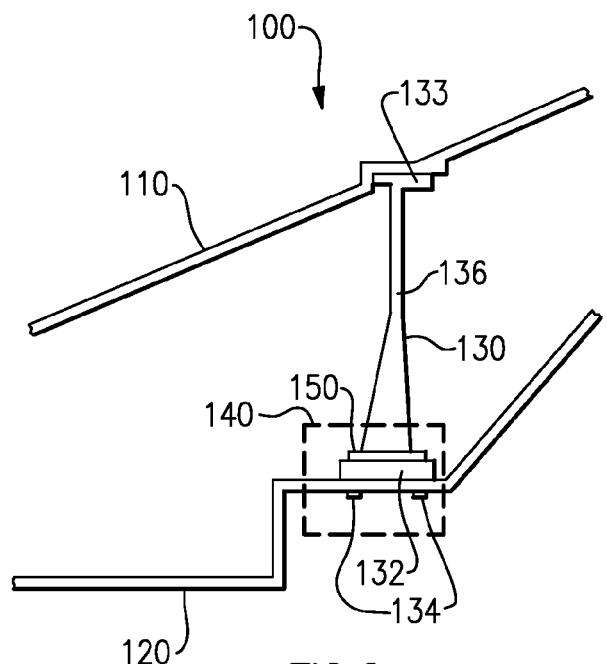
FIG. 2 schematically illustrates an tierod support assembly for a turbine engine.

FIG. 2 illustrates a zoomed in schematic view of a support assembly 100 that can be used in the example illustrated in FIG. 1. The support assembly 100 includes multiple tierod 130 support members arranged in a spoke configuration around an inner frame case 120, and connected to an outer frame case 110. Each of the tierod support members 130 includes a tierod base 132 connected to the inner frame case 120 and an tierod base 133 connected to the outer frame case 110. The inner tierod base 132 is connected to the inner frame case 120 using an inner frame case connection assembly 140. Each of the inner tierod base 132 and the outer tierod base 133 are wider than a tierod support stem 136, giving the tierod support member 130 a generally I-shaped cross section.

Included in the inner frame case connection assembly 140 are multiple fasteners 134, each of which protrudes through a fastener hole in the inner frame case 120, through a fastener hole in the tierod base 132 and into a self anti-rotating bushing component 150. The view shown in FIG. 2 illustrates a single self anti-rotating bushing component 150 connected to two fasteners 134. In a practical implementation it is understood that multiple bushing components 150 are used for each tierod base 132, with each bushing component 150 connected to at least two fasteners 134. One example implementation uses four fasteners 134 and two bushings components 150 for each tierod support member 130 in the support assembly 100. An alternate example uses a single bushing component 150 connected to three or more fasteners 134.

Figure 3:
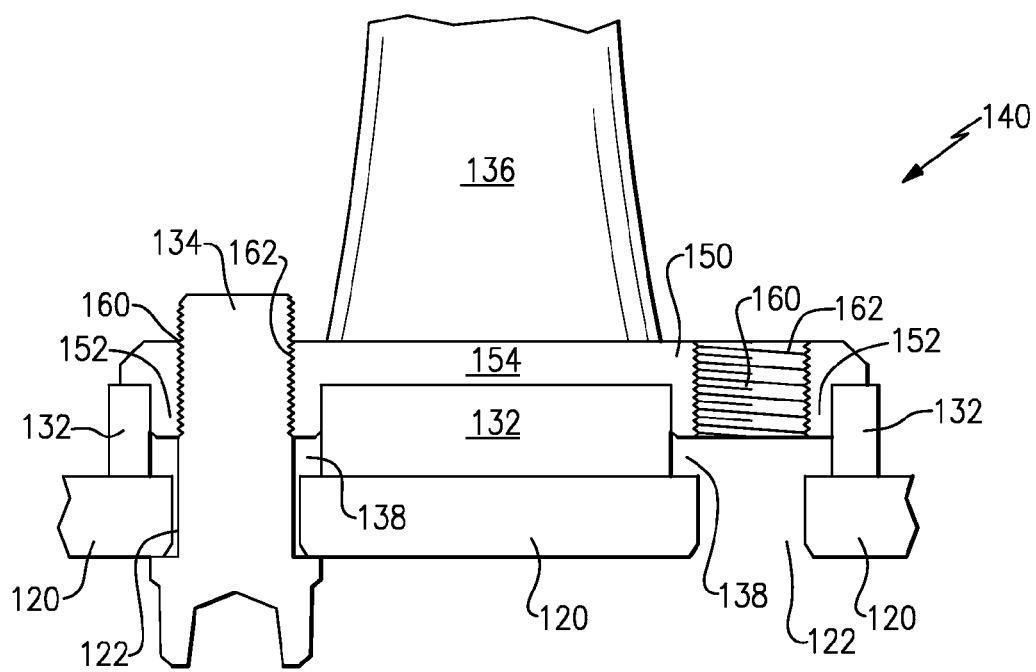
FIG. 3 schematically illustrates a zoomed in view of an inner frame case connection of the tierod support assembly illustrated in FIG. 2.

With continued reference to FIG. 2, FIG. 3 illustrates a zoomed in, sectional, inner frame case connection 140 of FIG. 2, with like numerals indicating like elements. The inner frame case 120 includes fastener holes 122, the tierod base 132 includes fastener holes 138, and the bushing component 150 includes fastener holes 160. Each of the bushing component 150 fastener holes 160 includes threading 162. The bushing component 150 is described in greater detail below with regards to FIGS. 4A and 4B.

In the installed configuration, each of the fastener holes 160, 138, 122 are aligned and a fastener 134 extends through the fastener holes 160, 138, 122. Due to the clearances of a practical turbine engine configuration, the bushing component 150 is limited to a minimal thickness along a radial line relative to the turbine engine 10. In order to increase the amount of threading available, and thereby increase the strength of the fastener joints 134, the bushing component 150 includes an extended threaded bushing 152, that extends into each fastener hole 138. The extended threaded bushing 152 extends the threading 162 of the bushing component 150 into the corresponding fastener hole 138 in the tierod base 132. Each of the bushing components 150 further includes a material tie 154 connecting the two fastener holes 160 of the bushing component 150.

In an installed arrangement, as is illustrated in FIG. 2, one of the extended threaded bushings 152 fits tightly into the corresponding tierod base 132 fastener hole 138 resulting in a press-fit arrangement. The other extended threaded bushing 152 is loose fit in the tierod base 132. This configuration is achieved in one example by making the extended threaded bushing 152 on one end of the bushing component 150 thicker than the extended threaded bushing 152 on the opposite end of the bushing component 150. In an alternate example, the configuration is achieved by making the tierod base 132 fastener holes 138 have different diameters, with one fastener hole 138 being sized to press fit the extended threaded bushing 152 of the bushing component 150, and the other fastener hole 138 being sized to loose fit the extended threaded bushing 152.

In one example, the threading 162 in the retention holes 160 does not deform when the fastener 160 is screwed in. By utilizing non-deforming threads 162, the bushing components 150 are removable and reparable without requiring an extensive overhaul of the tierod support assembly 130, or of the inner frame case 120. In another example configuration, the bushing component material tie 154 tying the two fastener holes 160 together thereby anti-rotating bushing component 150.

Figure 4A:
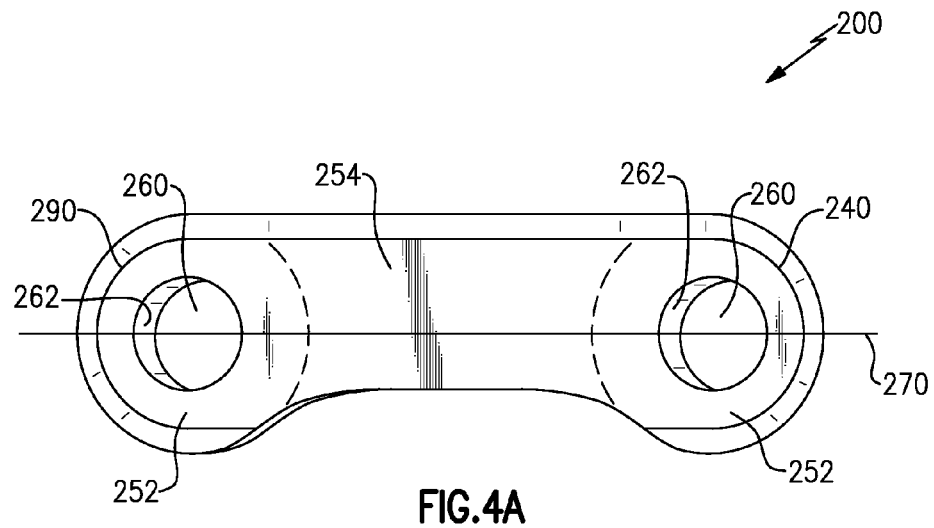
FIG. 4A illustrates a top view of a self anti-rotating bushing.
Figure 4B:
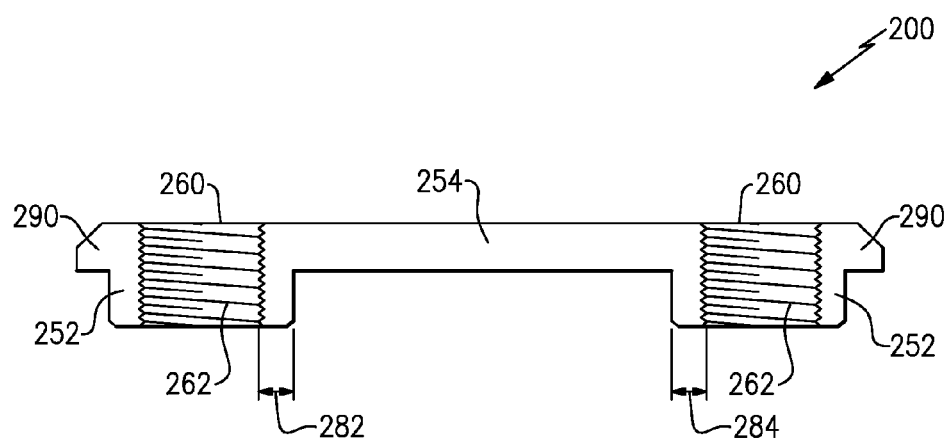
FIG. 4B illustrates a sectional side view of the self anti-rotating bushing of FIG. 4A.

FIG. 4A illustrates a top view of a bushing component 200, such as the bushing component 150 illustrated in FIGS. 2 and 3. FIG. 4B illustrates a side sectional view of the bushing component 200 illustrated in FIG. 4A. As illustrated in FIG. 4A, the anti-rotating bushing component 200 has two fastener sections 252, each of which includes a fastener hole 260. Each of the fastener holes 260 includes a threading 262 on the interior surface of the fastener hole 260. The two fastener sections 252 are connected by a material tie 254. While described above as separate portions, each of the two bushing sections 252 and the material tie 254 can be milled from, or cast as, a single block of material in one example.

The sectional view of FIG. 4B is cut along a plane perpendicular to the top surface of the self anti-rotating bushing component 200 along a sectional view line 270 (see FIG. 4A). The sectional view of FIG. 4B illustrates the fastener sections 252 in greater detail. Each of the fastener sections 252 has a greater length along an axis defined by fastener holes 260 than the material tie portion 254 connecting the fastener holes 260. Each of the fastener sections 252 also includes a rim portion 290. The rim portion 290 extends beyond a width 282, 284 of the extended portion of the fastener section 252.

In one example arrangement, the width 282 of the left fastener section 252 is larger than the width 284 of the right fastener section 252. The disparity in fastener section widths 282, 284 allows one of the fastener sections 252 to be press fit into a corresponding fastener hole 138 (illustrated in FIG. 3), with the other fastener section 252 being loose fit. The press fit section improves the ease of assembly by removing the requirement of a separate component holding the bushing component 200 in place during assembly. In an alternate example, the widths 282, 284 of the fastener sections are the same, and the widths of corresponding fastener holes 138 are varied. The alternate configuration allows for a similar press fit/loose fit arrangement.

The described bushing component 200 is a self anti-rotating component. Each of the fastener sections 252 includes an extended portion that extends into the corresponding fastener hole 138 in the tierod support members 130 base section 132. The extended portion prevents the fastener sections 252 from shifting positions and allows for additional threading without interfering with support assembly clearances. Furthermore, because the fastener sections 252 are tied together via the tying member 254, neither fastener section 252 can rotate within a fastener hole 138 (illustrated in FIG. 3) without the opposite fastener section 252 shifting positions. Thus, the inclusion of the tying member 254 causes the bushing component 200 to be self anti-rotating.

While the above description details a connection with the inner frame case 120, it is understood that a similar connection between the tierod 130 and the outer frame case 110 can be utilized in light of this disclosure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A self anti-rotating bushing component comprising:
a first threaded bushing portion having a first threaded fastener hole and a first extended threading bushing, the first extended threading bushing having a greater length along an axis defined by the first extended bushing portion than a material tie;
a second threaded bushing portion having a second threaded fastener hole and a second extended threading bushing, the second extended threading bushing having a greater length along an axis defined by the second extended bushing portion than the material tie;
the material tie portion connecting said first threaded bushing portion and said second threaded bushing portion; and
wherein said first extended threading bushing has a first radial wall width, said second extended threading bushing has a second radial wall width, and wherein said first radial wall width is larger than said second radial wall width.

2. The self anti-rotating bushing component of claim 1, wherein each of said first threaded bushing portion, said second threaded bushing portion, and said material tie portion are constructed of a single block of material.

3. The self anti-rotating bushing component of claim 1, wherein threading in said first and second threaded holes is non-deforming threading.

4. The self anti-rotating bushing component of claim 1, wherein threading in said first and second threaded holes is self-locking threading.

5. The self anti-rotating bushing component of claim 1, wherein each of said first and second bushing portions include a lip portion partially circumferentially surrounding each of said threaded fastener holes, and wherein each of said lip portions has a length along an axis defined by the fastener holes equal to a thickness the material tie along an axis of either of the first or second threaded holes.

6. A turbine engine comprising:
an inner frame case and an outer frame case;
at least one support assembly connecting said inner frame case to said outer frame case, wherein said support assembly comprises a plurality of tierod support members arranged circumferentially about the inner frame case, wherein each of said tierod support members comprises an inner base portion, an outer base portion, and a stem portion, such that each tierod has a generally I-shaped cross section, and each of said inner base portions comprises a plurality of base portion fastener holes; and
wherein each of said tierod support members is connected to said inner frame case via a case connection assembly including a self anti-rotating bushing component having a first threaded bushing portion with a first threaded fastener hole, a second threaded bushing portion with a second threaded fastener hole, and a material tie portion connecting said first threaded bushing portion and said second threaded bushing portion;
said first threaded bushing portion comprises a first extended threaded bushing and said second threaded bushing portion comprises a second extended threaded bushing such that each of said first and second bushing portions have a greater length along an axis defined by said first bushing portion than the material tie, and wherein said first extended threaded bushing portion extends into one of the plurality of base portion fastener holes and wherein said second extended threaded bushing portion extends into another of said plurality of base portion fastener holes, such that threading is extended into said base portion fastener holes; and
said first extended threaded bushing extends into a base portion fastener hole having a first radius and said second extended threaded bushing extends into a second base portion hole having a second radius such that one of said first and second extended threaded bushings is press fit into a base portion fastener hole and the other of said first and second extended threaded bushings is loose fit into a base portion fastener hole.

7. The turbine engine of claim 6, wherein threading in said first and second threaded fastener holes is non-deforming threading.

8. The turbine engine of claim 6, wherein threading in said first and second threaded fastener holes is self-locking threading.

9. The turbine engine of claim 6, wherein said material tie portion of said self anti-rotating bushing component prevents rotation of said self anti-rotating bushing component during installation of a fastener.

10. A method of connecting a tierod support to a frame case comprising the steps of:
- press fitting one of a first threaded bushing or a second threaded bushing of a self anti-rotating bushing component into a corresponding tierod base portion hole, and loose fitting the other of said first threaded bushing or said second threaded bushing into another corresponding tierod base portion hole;
- extending a first fastener through an inner frame case, through an tierod base portion, and into the first threaded bushing of the self anti-rotating bushing component;
- extending a second fastener through the inner frame case, through the tierod base portion, and into a second threaded bushing of the self anti-rotating bushing component;
- screwing said fasteners into the threaded bushings; and
- preventing said first threaded bushing and said second threaded bushing from rotating during any of said previous steps using a material tie connecting said first threaded bushing to said second threaded bushing.

\* \* \* \* \*